Figure 3:
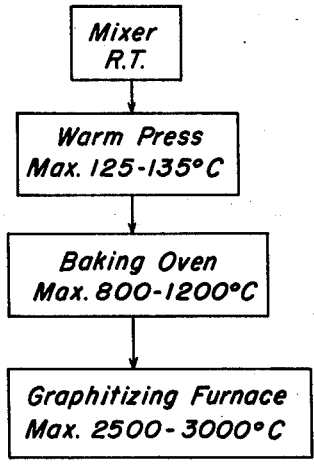

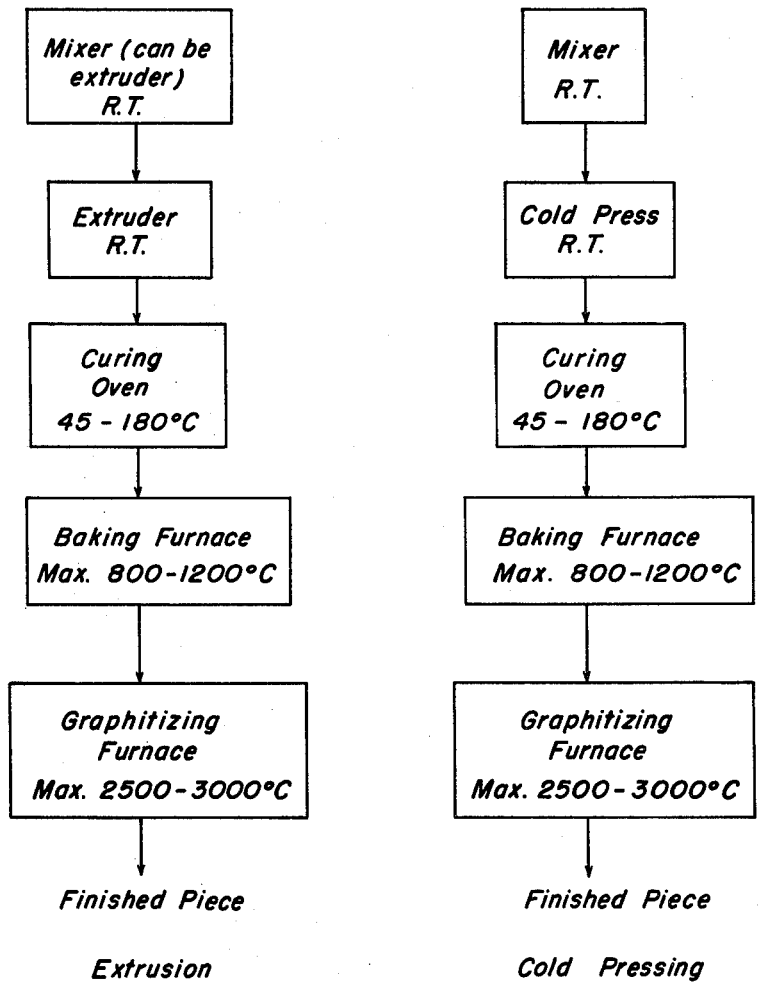

March 10, 1964    H. SHEINBERG ETAL    3,124,625
GRAPHITE PRODUCTION UTILIZING URANYL NITRATE HEXAHYDRATE CATALYST
Filed March 24, 1958    5 Sheets-Sheet 2

Warm Pressing

Hot Pressing

INVENTOR.
Haskell Sheinberg   Donald H. Schell
John R. Armstrong

Porous Graphite from Furfuryl Alcohol

INVENTOR.
Haskell Sheinberg  Donald H. Schell
John R. Armstrong

3,124,625
GRAPHITE PRODUCTION UTILIZING URANYL NITRATE HEXAHYDRATE CATALYST

Haskell Sheinberg, John R. Armstrong, and Donald H. Schell, Los Alamos, N. Mex., assignors to the United States of America as represented by the United States Atomic Energy Commission
Filed Mar. 24, 1958, Ser. No. 723,615
9 Claims. (Cl. 264—21)

This invention relates to novel methods and materials for obtaining graphite, dealing in particular with graphites obtained from starting mixtures containing novel types of binder mixtures and graphites containing uniform dispersions of metal carbides or metals.

In the prior art, graphite was customarily produced from a calcined petroleum coke. This coke was crushed and screened and a blend was formed between the coarser screenings or particles and the "flour" from the screen. To this blend was added a coal tar pitch to serve as a binder, the mixing taking place at about 165° C., at which temperature the pitch was quite fluid. When the graphite was to be formed by extrusion, a lubricant such as a petroleum oil was added.

The mixture was then either extruded or molded into "green" bars at a temperature of about 80–100° C., using a pressure of about 1 t.s.i. (tons per square inch) for the extrusion process and 0.5–2.0 t.s.i. for pressing in dies or molds. In extruding, it was necessary to maintain both the nozzle and the extrusion die at a critical elevated temperature, the exact value depending on the particular mix. Too low a temperature would allow voids in the extruded product while too high a temperature would make a thin mix which would fall away from the nozzle wall and lose its shape. After this forming step, it was necessary to cool the bars to room temperature to harden the pitch binder so that they could be handled without distortion. For the extrusion process, this required the use of water on the extruded product emerging from the nozzle to prevent it from slumping.

The next step was a baking of the green bars at a minimum temperature of 750° C. and as high as 1200° C. During this step it was necessary to support the bars on all surfaces by packing them with granular coke or a coke-sand mixture so that they would not slump or distort as they were heated through the temperature range in which the pitch binder was liquid. Considerable quantities of hydrocarbon gases were evolved from the pitch binder in the 300–500° C. range, the binder becoming hard at about 450° C. Considerable shrinkage took place as the bars were heated from 450° C. to the maximum temperature. This firing was carried on in a large gas-fired furnace and took as long as six weeks to complete a cycle for large pieces, e.g., 30 inches in diameter by 6 feet high.

After such baking step, the bars could be graphitized directly to obtain a product with a bulk density of about 1.55 grams/cc. Where higher densities were desired, the bars were first impregnated with pitch by pre-heating and vacuuming them in a pressure vessel, pumping in hot pitch to cover the bars, and increasing the pressure to about 100 p.s.i. for several hours.

The final, or graphitization step was a firing in an electric resistance furnace to a temperature of 2500–3000° C. This required that the bars be surrounded by a mixture of fine carborundum, coke and said for thermal insulation and protection against oxidation. The coke in the packing also served as the electric resistance element. The heating cycle lasted three to four days, and the necessarily slow cooling of the graphite bars required about two weeks more.

While the properties of graphites produced by such prior art methods varied considerably with such parameters as grain size and grain size distribution, calcining temperature, method of forming and graphitizing temperature, and also varied considerably with the source and history of the raw materials, optimum values of some properties of the best fine-grained molded stocks included bulk density, 1.75 grams/cc.; flexural strength parallel to grain, 4700 p.s.i., and perpendicular to grain, 4000 p.s.i.; and coefficient of thermal expansion parallel to grain, $19 \times 10^{-7}$ per ° C. Bulk densities as high as 1.91 grams/cc. could be obtained by replacing 20 w/o of the fine-grained coke flour with furnace black. Flexural strengths for other coke blends were much lower, typical values being 2300 p.s.i. for a medium grain stock and 1300 p.s.i. for a coarse grain stock.

In striving for high bulk density graphites, it is commonly recognized that the theoretical limit is the "real" density of natural graphite, i.e., the density of single crystals, 2.26 g./cc. The real density of a graphite is determined by subtracting from its bulk volume the fraction which can be occupied by a highly fluid substance, such as kerosene. This not only indicates the degree of perfection achieved in graphitization, but indicates the porosity and the extent to which the bulk density may be increased by eliminating the voids.

One objectionable property of the graphites of the prior art is their lack of uniformity in physical characteristics. These properties not only vary considerably from piece to piece in the same batch, but may vary as much as 30% across the diameter of a fairly large cross-section, e.g., a 24-inch diameter.

Another objectionable feature of the prior art process is the use of pitch as the binder. This material is initially objectionable because it cannot be mixed at room temperature. The fact that pitch melts at higher temperatures necessitates careful handling and precautions against slumping and warpage during the baking step. The evolution of volatile matter and the large volume shrinkage during the baking step causes considerable uneven changes in the dimensions of the finished bars from those of the green bars. The final product must be machined to the desired dimensions. Pitches are also extremely variable in composition and properties, not only from distillery to distillery, but from one batch to the next from the same distillery. Graphites made from such pitches reflect the same variations in properties unless great care is exercised to adjust the process variables for each different pitch.

One process whereby the starting materials of the prior art are used to avoid some of the objectionable features of prior art processes is disclosed in the patent of Stoddard and Harper, U.S. Patent No. 2,997,744, issued August 29, 1961, also assigned to the United States Government. This is a one-stop process, consuming, for small pieces having dimensions of the order of 2 inches, a total of only 1½ to 2 hours. A mixture of 55–66 w/o graphite flour or raw coke, 26–30 w/o coal tar pitch, and 8–15 w/o carbon black is hot pressed in a graphite die at 1200–1500 p.s.i. and a temperature of about 2500° C. The hot pressed pieces are 20% stronger than those of the prior art and have densities as high as 1.92 g./cc.

Although this process has certain obvious advantages, it does not avoid the necessity for heating the pitch binder to make it fluid enough to mix with the filler. It is also limited to forming at high temperatures; any attempt to modify the process to form the piece at room temperatures would re-introduce all of the above-mentioned limitations inherent in pitch binders.

It is, therefore, an object of the present invention to supplement the prior art methods of obtaining graphite by substituting for the pitch binders of the prior art a binder mixture which does not become liquid during the baking step.

It is another object to obtain graphite of more uniform physical properties than the graphites of the prior art.

It is a further object to provide a method for producing a graphite having superior physical strength.

Another and further object is to provide methods for obtaining graphites having densities ranging from the very low to those exceeding the densities of prior art graphites.

A further object is to provide starting compositions and methods for obtaining graphite by extrusion or molding to obtain shapes which need no outside support during the seubsequent heating steps.

A further object is to provide a material and method for impregnating graphite to increase its density by means of which the graphite can be impregnated at room temperature.

An additional object is to provide a graphitizable mixture which can be extruded at room temperature without the need for heating any part of the extrusion press and without means for cooling the extruded product.

Another object is to provide graphitizable mixtures containing compounds of metals which are reduced to carbides uniformly dispersed throughout the final graphite product.

Another object is to provide graphitizable mixtures containing metals or compounds thereof which form no carbides during the graphitizing process but appear in the final graphite product as uniform dispersions of such metals.

A further object is to provide a method for converting a graphitizable mixture containing one or more oxides of uranium into a graphite matrix having a uranium compound homogeneously distributed throughout its volume.

An additional object is to provide a method for forming such homogeneous dispersions of uranium atoms throughout a graphite matrix by combining the steps of adding some of the uranium substance to the raw source of carbon, graphitizing such combination, and adding to the graphitized combination a substance containing additional uranium.

Another and further object is a method for simultaneously increasing the density of graphite bodies and adding uranium atoms to form a homogeneous dispersion of such uranium throughout such graphite body.

An additional object is to provide methods for obtaining graphite bodies containing layers of different characteristics, which characteristics may include density and amounts of metals or metal compounds distributed throughout such layers but in which the composition and characteristics of any particular layer are uniform.

It has been recently discovered that pitch binders may be replaced with a binder which is most generally described as a liquid thermosetting oxygenated hydrocarbon compound. Such a binder may be a single such compound or may contain other such liquid compounds in solution or similar solid thermosetting oxygenated hydrocarbons in solution or suspension, but should always contain only known fractions of materials of definite chemical compositions and should be fluid at room temperature.

The oxygenated hydrocarbons selected should be easily polymerized or hardened by the addition of a catalyst or hardener, by slightly elevating its temperature, or both, to solidify and strengthen the mixture to be graphitized. In its original or its polymerized form, it must not adversely affect the other ingredients, including any compound of a fissionable or fertile element added when the graphite product is to form part of the core, reflector or breeder blanket of a homogeneous nuclear reactor. Its mixture with such other ingredients in proper proportions must be capable of room temperature pressings or extrusions which will maintain their forms without slumping and without outside support. Where high density graphites are required, this binder must also have a high coking value. It is also highly desirable that such a binder be capable of holding one or more compounds of various fissionable elements such as uranium in solution or suspension so that the binder may be used to "load" the graphite with such materials.

Many thermosetting oxygenated hydrocarbons have been found suitable for these purposes, e.g., oxygenated hydrocarbons of the phenol formaldehyde class. The particular oxygenated hydrocarbon found to be peculiarly suitable is furfuryl alcohol, $C_4H_3O \cdot CH_2OH$. This compound is liquid at room temperatures and boils at about 171° C. (750 mm. Hg). It is easily polymerized or cured by the addition of certain catalysts at temperatures as low as room temperature, although the setting proceeds more rapidly at higher temperatures. Suitable catalysts include maleic anhydride, sulfamic acid, nitric acid, oxalic acid, cupric nitrate and other soluble nitrates of copper, sodium and potassium. Some of these materials combine chemically with the furfuryl alcohol to some extent, and hence might be more properly called hardeners. Most of them appear to produce some water as the result of polymerization or chemical combination or both. The expressions "catalyst" and "hardener" are used interchangeably.

The present inventors have found that furfuryl alcohol can be catalyzed by uranyl nitrate hexahydrate, $UO_2(NO_3)_2 \cdot 6H_2O$ (hereinafter UNH). This invention makes it possible to make uranium-loaded graphites and also makes it possible to load with uranium preformed graphite bodies made without uranium or to increase the uranium content of uranium-loaded graphites by impregnation techniques. It has been found that UNH is soluble in furfuryl alcohol. This fact makes it possible to obtain a final product in which the uranium is homogeneously dispersed throughout the graphite matrix, i.e., a molecular dispersion in the graphitized binder.

The UNH catalyst may be effectively added in the range of from about 2 grams to about 30 grams per 100 cubic centimeters of furfuryl alcohol. It is possible to use even higher ratios, but the ensuing rapid reaction causes considerable violent bubbling, necessitating extra steps to eliminate such bubbles.

Furfuryl alcohol when catalyzed has a coking value of about 40 w/o. When catalyzed and used as an impregnant for commercial graphites, followed by the curing, baking, and graphitizing steps, it both strengthens such graphite and raises its density. The furfuryl alcohol fills the pores of the graphite and forms a tough, resilient network as it polymerizes. Because of its high coking value, this network of binder is maintained to a large extent after baking and graphitizing. There is even some reason to believe that it will shrink commercial graphites of average density, thereby increasing its density by an independent effect.

Figure 4:
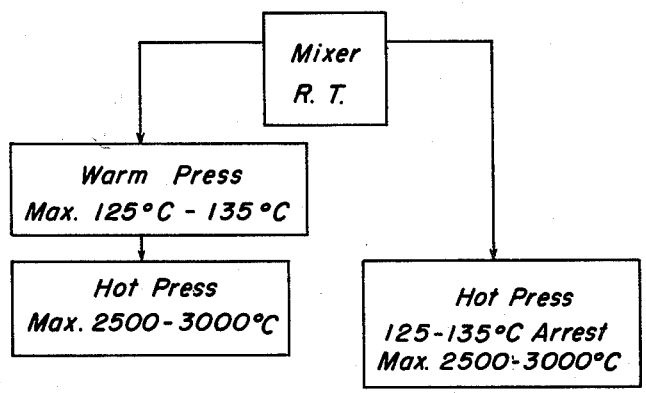
Figure 5:
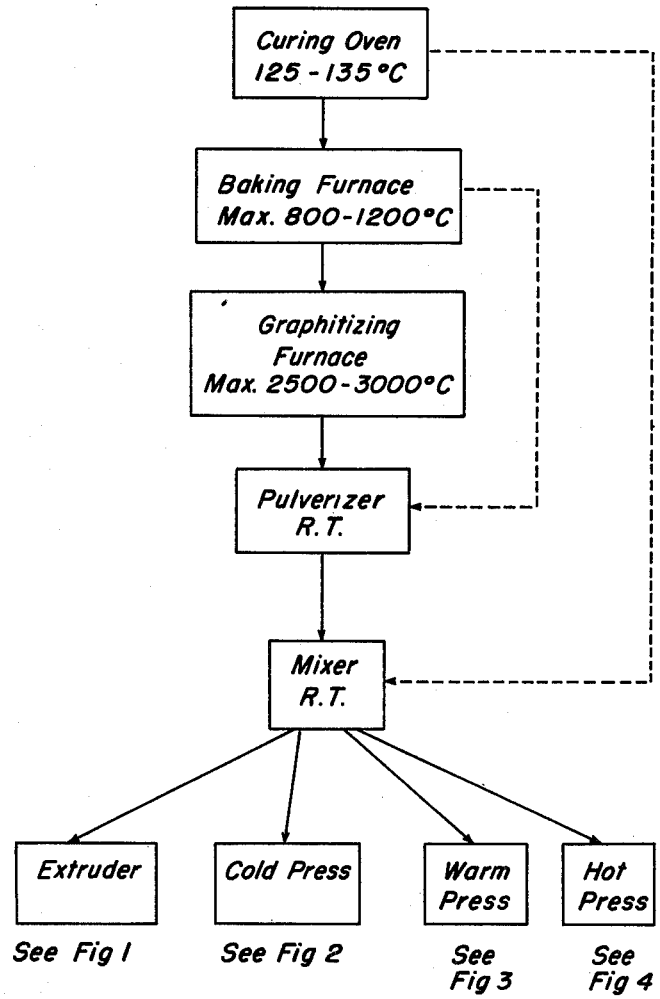

The processes of the present invention, whereby graphite is formed from mixtures including the above described binders and catalysts, may be more clearly understood by reference to the attached drawings, in which the steps in the various processes are indicated schematically and in which:

FIGURE 1 illustrates the making of graphite from room temperature extrusions,

FIGURE 2 depicts a similar process in which the raw materials are compacted by cold pressing, i.e., at room temperature, FIGURE 3 portrays a similar technique except that the body is formed by warm pressing, i.e., at a temperature sufficient to polymerize the binder in the charge, and FIGURE 4 shows a pair of like processes generally called hot pressing, in which the charge may be held under pressure in a single press during all of the heating steps (part b). Some advantage may be obtained by first warm pressing the charge and then transferring the cured and formed piece to a hot press for the baking and graphitizing steps (part a). In addition, FIGURE 5 illustrates the manner of making graphite in which furfuryl alcohol serves as both filler and binder, the dashed lines indicating alternative processes, and FIGURE 6 indicates various methods for impregnating a formed piece at various stages in its conversion to graphite. In each of parts a, b and c, the dashed flow lines pointing back to the impregnating tank indicate that the piece may be repeatedly impregnated. In part a the transfer steps are numbered to avoid confusion, alternative processes being indicated by dashed lines and prime or double prime numerals. Finally, FIGURE 7 shows the several alternative procedures by which graphite may be formed in layers having different compositions.

The processes of the present invention include the alternative forming steps of pressing and extruding. The extruding method, indicated in the flow sheet of FIGURE 1, is used for bars, tubes, and similar shapes, and is most simply practiced at room temperature, a fact which makes one or more preliminary extrusions useful for mixing the raw materials to be used for pressings. The raw materials may be either raw coke, calcined coke or graphite flour, together with one or more fine carbon blacks such as furnace black, lampblack or thermal carbon. The carbon black is added because of its very small particle size, enabling it to fill in the spaces between the larger coke or graphite flour particles and thereby form a dense product. It is not an indispensable ingredient and can be replaced with a very fine graphite flour for high density applications. The dry ingredients are thoroughly mixed with the catalyzed but as yet unpolymerized binder such as furfuryl alcohol, the proportions of ingredients depending on the process to be followed and the characteristics sought in the final product. When a relatively high loading of uranium is desired, a quantity of a uranium compound such as uranium dioxide is added to the raw materials. Such oxides have been added to the starting mixture in sufficient amounts to achieve uranium loadings as high as 1.5 grams per cc. of the graphite body, and the upper limit appears to be much higher. These oxides are all reduced to uranium carbides in the high temperature graphitization step.

In forming by pressing, the charge in the press may be cold pressed at room temperature, warm pressed at a sufficient temperature to set or "cure" the binder, or hot pressed all the way to graphitizing temperatures. It is sometimes of advantage to cold press or warm press in steel dies and then hot press in a set of graphite dies.

Cold pressing may be practiced by any of the well-known techniques, such as die pressing and hydostatic pressing. In die pressing, the mixture is loaded into a steel die and compressed at moderately high pressure (2–7 t.s.i.) and room temperature. The rest of the complete cycle, as indicated in FIGURE 2, includes a curing step in an electric oven at a temperature which is increased from 50° C. to 100° C. in a day's time (or by the 45° C. to 180° C. cycle indicated below, in note 4 preceding the examples), a baking step in an electrical resistance furnace wherein the cured piece is unsupported but protected from oxidation and is heated at about 800–1200° C., and a graphitizing step in which the piece is heated to a temperature of 2500–3000° C. in an induction furnace or a graphite electrical resistance furnace. This cold pressing method has the advantage of providing maximum utilization of the available pressing equipment, but has the disadvantage of making pieces of lower density than warm pressing or hot pressing. The latter disadvantage can be corrected by impregnating the pressed piece at any one of several stages, as will be discussed more fully below.

By referring to FIGURE 3 of the drawings it can be seen that in forming the green compacts by warm pressing, the operation is carried out at a slightly elevated temperature, usually 125–135° C., so that molding and polymerization are accomplished simultaneously. The pressed piece consists of a compact of carbon tightly knitted together by a solid binder which does not thereafter undergo any change which will cause the piece to lose its shape, except some slight shrinkage. As the compacts are "baked" or heated in the coking furnace, and are subsequently "graphitized" or heated to a maximum temperature of 2500–3000° C., the polymerized binder does not liquefy or vaporize, but rather decomposes to emit various vapors, leaving behind essentially only graphite. The warm pressing technique has the advantage of eliminating the separate curing step at the expense of a longer dwell time in the press. The warm pressings generally have higher densities than cold pressings of the same starting mix.

In hot pressing (see FIGURE 4), the mix may either be previously warm pressed to take advantage of the high pressures possible with steel dies and then hot pressed to the graphitizing temperature in a press equipped with a graphite die and graphite plungers, or both steps may be performed in the graphite die, the temperature being raised slowly through the low values suitable for curing.

Note that in the cold pressing process, the formed piece is cured at from only 50° C. to 100° C. over a considerable length of time, whereas in warm pressing the charge is heated directly to 125–135° C. without the low temperature step. The low temperature curing step is necessary in cold pressing because a rapid heating to higher temperatures of the unsupported formed piece causes it to swell and deform, sometimes even spalling and laminating. This result follows from the formation of steam from the water of condensation as the binder polymerizes. While the same action takes place in pressing at elevated temperatures, the same precautions are unnecessary because the charge is supported and cannot be disrupted by escaping steam.

Hot pressings have the maximum density but not maximum strength. The best combination of high strength and high density are achieved in cold and warm pressings and extrusions which are impregnated several times with the binders of the present invention.

In the extrusion process, illustrated in FIGURE 1, the present invention is again practiced by mixing the polymerizable binder with the primary sources of carbon at room temperature, adding an appropriate quantity of a material which serves as both a lubricant and a strengthener for the green extrusion. It is not necessary or desirable to perform the extrusion with a heated mix or with the extruder parts at an elevated and closely controlled temperature, as was necessary in the prior art. The green extrusion is then heated to a relatively low temperature to polymerize the binder. After this step, the extrusion will not lose its shape, and it is baked without the need for the elaborate precautions against slumping and distortion which were required by the prior art methods. The now polymerized binder will decompose but will never liquefy, no matter how high its temperature is raised.

A suitable material for the lubricant strengthener in the extrusion method of forming graphite is methyl cellulose. When this material is added in the proportion of about 0.25–7.5 w/o of the total weight of all materials, including the furfuryl alcohol and UNH, the mix can be extruded into various shapes, including rods and tubes. The resulting extrusions are pliable, but they can be handled without loss of shape. The subsequent step of heating to a low temperature to polymerize the furfuryl alcohol freezes the extrusion into a permanent shape. No part of the press is heated, nor is it necessary to cool the extrusion with water, as was required with the prior art (pitch) process.

It has also been found that a high grade of porous graphite can be produced by using furfuryl alcohol as the sole source of carbon. In this process, illustrated in FIGURE 5, a batch of furfuryl alcohol is first mixed with UNH and hardened by heating at a low temperature, and is then baked or both baked and graphitized, the latter being preferable because it decreases subsequent shrinkage. The solid material is then ground to a powder and added to another quantity of liquid furfuryl alcohol and UNH. This material is then warm molded to form the desired shape and to polymerize the liquid furfuryl alcohol, after which it receives the necessary coking and graphitizing treatments. Although the graphite thus produced may have a density as high as 1.57 g./cc. with a maximum fiber stress of 2780 p.s.i., its outstanding feature is that it can be made with a very low density but relatively high maximum fiber stress, depending on the molding pressure, particle sizes and particle size distribution in the catalyzed furfuryl alcohol powder. Densities as low as 1.28 g./cc. with maximum fiber stress of 3200 p.s.i. have been obtained. Such low density, high strength graphites are eminently suitable for use as corrosion resistant filters, e.g., in chemical purification operations, and as porous moderators in nuclear reactors.

In the examples listed below there are included some which show that the polymerizable binders of the present invention are suitable for use with petroleum cokes. Owing to the variations in composition of such cokes, it is extremely difficult to obtain graphites having reproducible characteristics in going from one small batch of coke to another, even though they may have a common origin in a single lot. Cokes are also objectionable for cold or warm pressing operations in that they shrink considerably in the subsequent baking step and thus make it difficult to control dimensional tolerances. Thus it is advantageous to use a screened graphite flour, which may be regarded as a coke that has been graphitized and ground in preliminary steps. Such graphite flours have advantages of being pre-shrunk and of being more uniform in composition.

Figure 6:
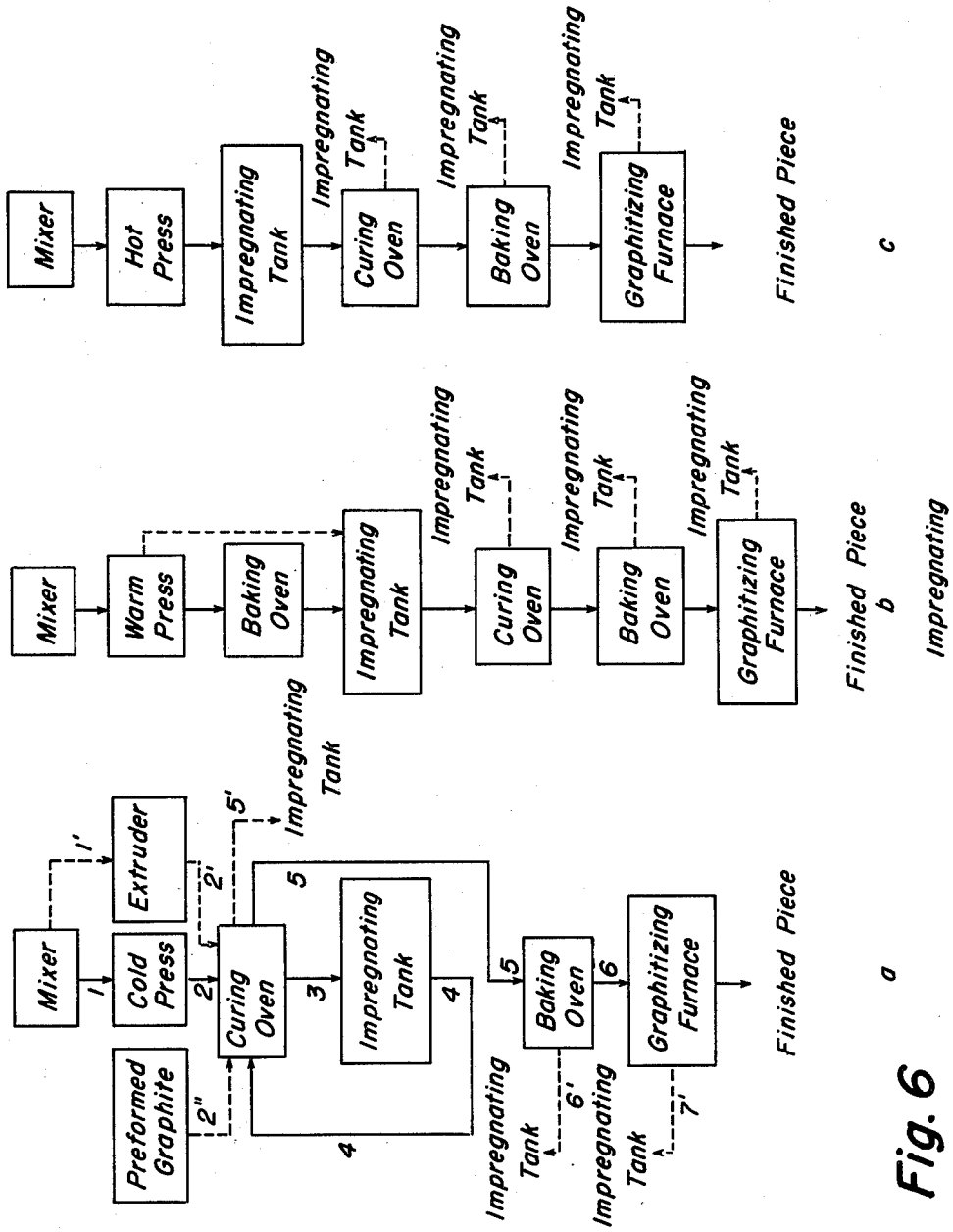
Figure 7:
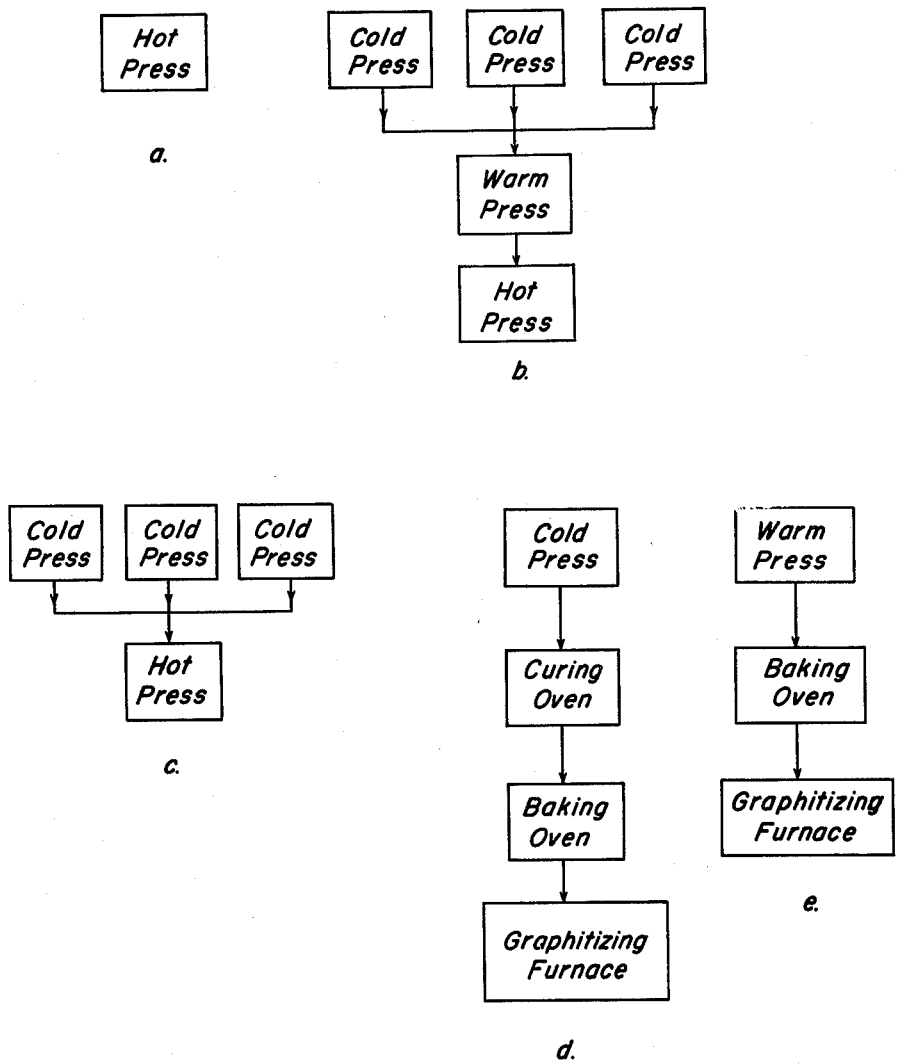

In impregnating to increase the density and strength of graphites or graphitizable mixtures, the polymerizable impregnant may be added after the curing step, after the baking step, after the final graphitization, or any combination thereof, as indicated in FIGURE 6. It is necessary to repeat the operations previously performed on the charge up to the point of impregnation, e.g., if the binder is added after curing, the curing operation must be repeated; if added after baking, both the curing and baking steps must be repeated, etc., prior to carrying the piece through the necessary remaining steps of the final heating cycle. The general procedure for impregnating is simply to exhaust the air in a container, holding the specimen to a modest vacuum, transfer the impregnant to immerse the specimen, provide an overpressure of a non-reactive gas for a few minutes, and drain, all at room temperature.

The above alternatives of impregnating at any stage, including after graphitization, may be followed for an unloaded graphite, typically intended for use as the moderator in a heterogeneous nuclear reactor or as a reflector for various types of nuclear reactors. Where the planned use is in a homogeneous reactor and the graphite is highly loaded, i.e., made with a uniform and highly concentrated dispersion of one or more elements having fissionable or fertile isotopes, such as uranium, it becomes necessary to avoid the impregnating of specimens already graphitized. This limitation appears to be the result of the hydrolysis of the uranium carbides, to which the uranium in the oxide, the UNH, or other original form is converted in the graphitization step, by the water liberated in the condensation polymerization of the furfuryl alcohol or other binder which liberates water in polymerizing. This hydrolysis apparently converts the uranium carbides to oxides and causes volume changes and gas evolution which weaken the graphite body and may cause it to disintegrate into power.

It has been found that the methods of the present invention may be thus practiced with any of the oxides of uranium, e.g., $UO_2$, $U_3O_8$ and $UO_3$. It is immaterial to the present processes how much of the uranium in such oxides consists of fissionable isotopes. It is only necessary to keep of the quantity of such fissionable isotopes sufficiently low to avoid a critical assembly.

It has also been discovered that "sandwiches" of graphite can be prepared by following the general methods of the present invention. These sandwiched graphites may contain unloaded graphite in one or more layers and loaded graphite in the remainder and are typically used in a homogeneous nuclear reactor having a graphite reflector. By any of several methods, compacts may be produced wherein there is a sharp planar discontinuity in going from a loader layer to an unloaded layer, but having a uniform structure with no tendency to laminate or other weaknesses at the interfaces between layers. The methods successfully developed include:

(1) Loading a first type mix into a graphite die, then a second and third, etc., then hot pressing at about 1000 p.s.i. and 2500°–3000° C., with an introduced arrest at about 125° C. to properly cure the binder, as in part $a$ of FIGURE 7, (2) Cold pressing each mix separately in a steel die, then warm pressing the three compacts together in a steel die to form a single compact, followed by graphitization of such single compact in a graphite die, as in part $b$ of FIGURE 7, (3) Cold pressing each mix separately in a steel die, then hot pressing the three compacts together in a graphite die, again with an introduced low temperature arrest to properly cure the binder, as in past $c$ of FIGURE 7, and (4) Loading the three layers into one steel die and either cold pressing or warm pressing the layers into a single compact, followed by the necessary curing (for cold pressing) baking and graphitizing steps in appropriate ovens and furnaces. These two processes are illustrated in parts $d$ and $e$ of FIGURE 7, respectively.

To better enable those skilled in the art to understand and practice the present invention, there are outlined below several example of the procedures followed in producing graphites, together with some indications of the properties of such graphites.

EXAMPLES

I. *General Notes*

Unless otherwise indicated, the following notes apply to all examples listed below:

(1) The graphite flour used was essentially —100 mesh (Tyler sieve series, as are all mesh sizes herein). A typical sieve analysis shows 98 w/o of —100 mesh (2 w/o +100 mesh), 22.2 w/o of —100 +150, 19.9 w/o of —150 +200, 14.1 w/o of —200 +250, 0.8 w/o of —250 +270, 6.1 w/o of —270 +325, and 34.9 w/o of —325 mesh, with an average particle size of 3.22 microns for the fraction passing the 325 mesh screen. This is a relatively coarse-grain material, little effort having been made to obtain the maximum strength graphites which is possible through the use of fine grain raw materials. A typical graphite flour used is Great Lakes Carbon Co.'s No. 1008 graphite flour.

(2$a$) The thermal carbon used is similar to that described in Mrozowski, U.S. Patent 2,682,686, at column 3, lines 29–40. The material used had an average particle size of 1.08 microns, as determined with a Fisher sub-sieve analyzer and assuming a theoretical carbon density of 2.00 g./cc. A typical material used was the "Thermax" manufactured by the Thermatomic Carbon Co. This material was freshly screened to —100 mesh into a stationary container before use to avoid the effects of agglomeration.

(2$b$) The methyl cellulose used was Dow Chemical Co.'s "Methocel" having a viscosity of 4000 cps. at 25° C.

(2$c$) Suitable unfilled phenol formaldehyde resin binders are Durez No. 237, made by Durez Plastics and Chemical Co., and Resinox No. 468, made by the Monsanto Chemical Co.

(3) The charge for a pressing in a 2-inch diameter was approximately 40 grams.

(4) The temperatures used were:

Oven curing _____ 50° C. for about 8 hours, then 100° C. for about 4 hours. Alternative: 45° C. for 6 hours, continuous rise to 180° C. in 33 hours.
Warm pressing ____ 125–135° C.
Baking _____ 800–1200° C., usually about 1000° C.
Graphitizing _____ 2500–3000° C., usually about 2500 or 2650° C.

All temperatures listed throughout this specification in the graphitizing ranges are those observed with an optical pyrometer reflected from a ¼-inch thick back surface mirror.

(5) The times used for 40-gram charge were:

Cold pressing _____ Few seconds.
Warm pressing ____ 15 minutes at pressure and temperature.
Hot pressing _____ Preliminary warm pressing for 15 minutes, hot pressing at graphitizing temperature for 10 minutes.
Baking _____ 24 hours in reaching and holding top temperature plus 24 hours cooling in place to room temperature or to 100–200° C.
Graphitizing _____ 1 hour to reach temperature, 15 minutes at temperature and 4 hours to cool in place to room temperature or to 100–200° C.

(6) Loads used for cold pressing and warm pressing, in which steel dies and plungers were used, were 15 tons for a 2-inch diameter die and 60 tons for a 4-inch diameter die, or about 4.77 t.s.i. Above such pressures, no appreciable gain in strength or density was noticeable. For hot pressings, wherein only graphite dies and plungers are feasible, the pressure used was approximately 1000 p.s.i.

(7) Oven or furnace conditions were: (1) electric, air-circulating ovens for curing, (2) electric furnaces for baking, the specimen resting in a graphite or steel container without lateral support, and (3) induction furnaces for graphitizing, the piece again resting unsupported in a graphite crucible which was surrounded by lampblack to prevent oxidation.

(8) The density of the final product was determined by accurate weighings and micrometer measurements after machining to a smoothly dimensioned transverse break specimen. The maximum fiber stress was determined by transverse break tests in accordance with the method described on pp. 125–126 of the Metals Handbook (American Society for Metals, Cleveland, 1948), under the heading "Bend Tests for Hard and Brittle Materials." The specimens were machined to 0.250±.002 inch by 0.500±.002 inch by 1.375±.005 inches, and were mounted on the two knife edges, spaced one inch apart, with the 0.250-inch edges vertical. The single load was centrally applied, slowly enough to avoid shock loading, through a knife edge having the same radius as the stationary knife edges. For each 2-inch diameter disc pressed from a 40-gram charge in the example below, two such specimens were prepared and tested. Where only one figure is listed for maximum fiber stress, the two results were practically identical and the figure given is the average of the two results.

In testing tubes and rods, conditions, materials, and equipment were identical to those listed above, except that the span between the fixed knife edges was 1½ inches.

(9) Where "loaded" specimens are listed, the starting mixture contained a fraction of a metal compound or element, either in the filler or the binder, or both. The metal remained after processing, though in most cases converted to carbides. Where "unloaded" specimens are listed, no such material was added to the starting mixture.

II. Cold Pressing (1) *Unloaded specimen CH–10.*—Mix was 340 grams graphite flour, 60 g. thermal carbon, 28 g. methyl cellulose and 80 g. furfuryl alcohol catalyzed with 13.6 grams maleic anhydride per 100 cubic centimeters of furfuryl alcohol. A 40 gram charge was pressed in a 2-inch diameter steel die at 20 tons, cured, baked and graphitized. Its density was 1.68 g./cc. and its maximum fiber stress 1200 p.s.i. Similar runs with decreasing amounts of methyl cellulose produced pieces of gradually increasing density, indicating the low coking value of methyl cellulose (about 12.5 w/o).

III. Cold Pressing Plus Impregnation (1) *Unloaded Specimens J–691 and J–692.*—Mix was 85 g. graphite flour, 15 g. thermal carbon, 20 g. furfuryl alcohol catalyzed by 12 g. maleic anhydride per 100 g. furfuryl alcohol. Charges were cold pressed in 2-inch diameter die, cured, impregnated with furfuryl alcohol catalyzed with 8 g. maleic anhydride per 100 g. furfuryl alcohol, cured, impregnated as before, re-cured, re-baked, and finally graphitized. The average density of the machined pieces was 1.83 g./cc. and the average maximum fiber stress of the 4 test specimens was 3325 p.s.i.

(2) *Loaded specimen LDH–100.*—The dry mix was 77.71 w/o graphite flour, 13.71 w/o thermal carbon and 8.58 w/o $UO_2$. To this was added furfuryl alcohol binder in the amount of 18 w/o of the dry mix, the binder containing 12 grams of maleic anhydride per 100 grams of uncatalyzed binder. A 1236-gram charge was cold pressed to form a 10″ x 8″ x ½″ plate, cured, impregnated with furfuryl alcohol containing 8 g. of maleic anhydride per 100 g. uncatalyzed impregnant, re-cured, baked and graphitized. The final total density was 1.83 g./cc., with a loading of 0.125 g. U/cc. Maximum fiber stress was not measured.

(3) *Loaded specimen LCG–19.*—The starting mixture was made of 228.6 g. graphite flour, 40.5 g. thermal carbon, 30.9 g. $UO_2$, 1.5 g. methyl cellulose, and 75 g. furfuryl alcohol, the last containing 12 g. maleic anhydride per 100 g. of uncatalyzed resin. A 40-gram charge was cold pressed in a 2-inch diameter die, cured, impregnated with furfuryl alcohol containing 8 g. maleic anhydride per 100 g. uncatalyzed impregnant, re-cured, baked, impregnated a second time with the same impregnant, re-cured, re-baked and finally graphitized. The finished piece had a final total density of 1.97 g./cc., with a uranium loading of 0.150 g. U/cc. (making the density of the graphite by itself approximately 1.82 g./cc.). The two transverse break specimens yielded maximum fiber stresses of 3648 p.s.i. and 3696 p.s.i.

IV. Warm Pressing (1) *Unloaded specimen J–690.*—A 40-gram charge of the same composition as specimen III–1 above, i.e., about 71 w/o graphite flour, 12.5 w/o thermal carbon and 16.5 w/o furfuryl alcohol catalyzed with 12 g. maleic anhydride per 100 g. binder, was warm pressed in a 2-inch diameter die, baked and graphitized. Final density was 1.85 g./cc. and average maximum fiber stress was 2500 p.s.i.

(2) *Unloaded specimens R–1 through R–3.*—The dry mix was composed entirely of the −325 fines of a graphite flour, 100 g. of such fines being mixed with 20 g. of binder containing 15.3 g. of maleic anhydride per 100 cc. of uncatalyzed resin. Three 40-gram charges were warm pressed in a 2-inch diameter die, baked, and graphitized. Final densities ranged from 1.78 to 1.84 g./cc., with an average of 1.80 g./cc., and maximum fiber stresses averaged 2130 p.s.i. for the six test pieces.

(3) *Unloaded specimen J–549.*—The dry mix was 85 g. graphite flour and 15 g. thermal carbon, to which was added 20 g. of binder composed of 15.3 g. maleic anhydride per 100 cc. of furfuryl alcohol. A 40-gram charge was warm pressed in a 2-inch diameter die, baked and graphitized in the usual manner. Final density was 1.85 g./cc. and maximum fiber stresses were 2450 and 2880 p.s.i.

(4) *Unloaded specimens CA–15 and CA–16.*—80 grams of a −100 mesh raw petroleum coke was calcined at 1000° C. and, upon cooling, was mixed with 20 g. of furfuryl alcohol which had been pre-mixed with about 15.3 grams of maleic anhydride per 100 cc. of the uncatalyzed binder. Two specimens were warm pressed in a 2-inch diameter die, baked and graphitized. Final densities were 1.82 and 1.84 g./cc. The four transverse break specimens were tested to yield maximum fiber stresses ranging from 1200 to 1820 p.s.i. with an average of 1600 p.s.i.

(5) *Unloaded specimens CA–24 and CA–25.*—The mix was 80 g. of graphite flour, 10 g. of −100 mesh petroleum coke which had been calcined at 1200° C., and 20 g. of catalyzed furfuryl alcohol, the catalyst being 15.3 g. maleic anhydride per 100 cc. of the hydrocarbon. 40-gram charges were warm pressed in a 2-inch diameter die, baked and graphitized. Final densities were both 1.83 g./cc. and maximum fiber stresses ranged from 1340 to 1630 p.s.i. with an average of 1500 p.s.i.

(6) *Unloaded specimens J–447 and J–448.*—85 grams of petroleum coke (Texas 95) was mixed with 15 g. of a ball-milled graphite flour (Dixon Crucible Co. No. 200–10) and 20 grams of catalyzed furfuryl alcohol (15.3 g. per 100 cc. of uncatalyzed binder). Two specimens were pressed at 135–145° C. in a 2-inch diameter die, baked and graphitized. Both of the discs had a density of 1.84 g./cc. The four test specimens ranged in maximum fiber stress from 2800 to 3070 p.s.i. with an average of 2970 p.s.i.

(7) *Loaded specimen LCL–2.*—A starting mixture was made of 1700 g. graphite flour, 300 g. thermal carbon, 92 g. $UO_2$ and 400 g. furfuryl alcohol containing 15.3 g. maleic anhydride per 100 cc. of uncatalyzed binder. A 40-gram charge was warm pressed in a 2-inch diameter die, baked and graphitized to yield a final total density of 1.86 g./cc. with a loading of 0.075 g. U/cc. The transverse break specimens averaged 3120 p.s.i. maximum fiber stress.

(8) *Loaded specimen LCM–1.*—The dry filler contained 76.2 w/o graphite flour, 13.5 w/o thermal carbon and 10.3 w/o $UO_2$. Furfuryl alcohol catalyzed with a maleic anhydride addition of 12 g. per 100 g. uncatalyzed binder was added in the amount of 20 w/o of the dry mix. A 40-gram charge was warm pressed in a 2-inch diameter die, baked and graphitized. Final total density was 1.94 g./cc., with a uranium loading of 0.150 g. U/cc., and the average maximum fiber stress was 3550 p.s.i.

V. *Warm Pressing and Impregnation*

(1) *Loaded specimen LCB–5.*—A mix was made of 1700 g. graphite flour, 300 g. thermal carbon, 314 g. of −325 mesh $UO_2$ and 400 g. furfuryl alcohol catalyzed within the ratio of 12 g. maleic anhydride per 100 g. of the uncatalyzed resin. 180 grams of this mix was warm pressed in a 4-inch diameter die at 135–145° C. for 15 minutes with a load of 60 tons, then baked and graphitized as usual. The total density was 2.02 g./cc. and three specimens cut from the disc had an average maximum fiber stress of 2960 p.s.i. The remainder was impregnated with furfuryl alcohol catalyzed as above, cured, re-baked and re-graphitized. Three further specimens then exhibited an average maximum fiber stress of 3790 p.s.i. (Final density not measured.)

(2) *Unloaded specimen J–927.*—The starting mixture was 85 g. of a petroleum coke calcined at 1500° C., 15 g. thermal carbon and 20 g. of a furfuryl alcohol binder catalyzed with 12 g. maleic anhydride per 100 g. of uncatalyzed binder. A 40-gram charge of this mixture was first warm pressed and baked. The 2-inch diameter disc was then impregnated with furfuryl alcohol containing 8 g. of maleic anhydride per 100 g. of uncatalyzed impregnant, re-cured, re-baked and graphitized. The final density was 1.89 g./cc. and maximum fiber stresses were 3648 and 3744 p.s.i.

VI. *Hot Pressing*

(1) *Unloaded specimen J–58.*—Dry blend was 90 w/o graphite flour and 10 w/o thermal carbon, to which was added 20 grams of catalyzed furfuryl alcohol per 100 grams of dry blend, the catalyst or hardener having been added in the ratio of 6 grams maleic anhydride per 100 grams of furfuryl alchol. Two mixes were warm pressed in a 4-inch diameter die, then vacuum dried at 600° C. for 12 hours, followed by a hot pressing. The graphite discs had densities of 1.96 g./cc. and average maximum fiber stresses of 2475 p.s.i.

(2) *Unloaded specimen BT–1.*—The starting mixture was 90 g. graphite flour, 10 g. thermal carbon and 20 g. binder composed of 12 g. maleic anhydride per 100 g. uncatalyzed furfuryl alcohol. A 40-gram charge was first warm pressed in a 2-inch diameter steel die, then hot pressed in the same size graphite die. The final density of the specimen was 1.87 g./cc., with maximum fiber stresses of 2440 and 2600 p.s.i.

(3) *Loaded specimen LBK–9.*—The starting mixture was 60.3 graphite flour, 11.3 g. thermal carbon, 3.84 g. of extra fine graphite flour, 24.6 g. $UO_2$ and 16 g. furfuryl alcohol binder catalyzed with maleic anhydride (12 g. catalyst per 100 g. uncatalyzed binder). A 40-gram charge was hot pressed in a 2-inch diameter die to yield a final density of 2.17 g./cc., uranium loading 0.5 g. U/cc., and an average maximum fiber stress of 2870 p.s.i.

VII. *Extruding and Extruding Plus Impregnation*

(1) *Unloaded specimens CH–2.*—A blend was prepared of 340 g. of graphite flour, 60 g. of thermal carbon, 12 g. of methyl cellulose and 80 g. of catalyzed furfuryl alcohol, the catalyst being 8 g. of maleic anhydride added to 100 g. of uncatalyzed binder. These ingredients were mixed in a muller and loaded at room temperature into an extruder having a 1.25-inch diameter die and a 0.362-inch nozzle. With all materials and equipment at room temperature, the mix was extruded into the open atmosphere without cooling to form ⅜-inch diameter bars with a 3 ton load on the die. The green bar stock was then cured, baked and graphitized in the usual manner. This material had a final density of 1.78 g./cc. and a maximum fiber stress of 3190 p.s.i., average of 3 pieces.

A portion of this extrusion was cured, then baked in a vacuum, then impregnated with the same catalyzed furfuryl alcohol, cured, vacuum maked and finally graphitized, yielding a final density of 1.82 g./cc. and a uniform maximum fiber stress of 4915 p.s.i. for the three specimens tested.

Another portion of the same extrusion was cured, baked in the usual manner, impregnated with the same binder, re-cured, re-baked, and graphitized. Final density was not measured, but the average maximum fiber stress of three specimens tested was 5600 p.s.i.

(2) *Loaded specimens LCG–4.*—A mix was made of 1700 g. graphite flour, 300 g. thermal carbon, 314 g. of −325 mesh $UO_2$, 58 g. methyl cellulose and 610 g. furfuryl alcohol catalyzed with 15.3 g. of maleic anhydride per 100 cc. of uncatalyzed binder. A 256 g. charge of this mix was mulled and extruded at room temperature through a nozzle having an O.D. of about ⅜ inch and an I.D. of 1/16 inch by a 3-inch diameter die loaded at 22 tons. The extrusion was cured, baked and graphitized to yield a density in the polished tubes of 1.92 g./cc. total, a uranium loading of 0.150 g./cc., and maximum fiber stresses of 5070, 4780 and 4505 p.s.i. These specimens were graphitized in a continuous graphite tube furnace held at 2800° C. and required only 15 minutes in the furnace.

Three lengths of the same extrusion were cured and baked and impregnated with furfuryl alcohol containing 8 g. maleic anhydride per 100 g. of uncatalyzed impregnant. The impregnated tubes were then cured, baked and graphitized as above, yielding a final total density of 1.95 g./cc. and maximum fiber stresses of 5150, 5610 and 6060 p.s.i.

(3) *Loaded specimens LCG–5.*—A basic dry blend of 147 g. graphite flour plus 25.9 g. thermal carbon plus 27.1 g. of −325 mesh UO₂ was mixed with 10 g. methyl cellulose and 51.9 catalyzed furfuryl alcohol (15.3 g. maleic anhydride per 100 cc. of uncatalyzed binder). This mixture was mulled, extruded twice for thorough mixing, then finally extruded through a 0.362-inch diameter nozzle by a 1¼-inch diameter die loaded at 1 ton, the mix and all equipment being at room temperature. The extrusion was then cured, baked and graphitized in the usual manner. Final density was 1.89 g./cc. with a uranium loading of 0.150 g./cc. About 12 pieces of the rod were cut to a length of 2 inches and tested in transverse break according to the method outlined in note 8 above, yielding an average maximum fiber stress of 5270 p.s.i., the range extending from a low of 4435 p.s.i. to a high of 6060 p.s.i.

VIII. *Impregnating*

(1) *Loaded specimens NB7363–26.*—15 square graphite plates of commercial origin (Graphite Specialities Co.) of dimensions 1.463 inches by 1.467 inches and a total height of 1.900 inches weighed 88.58 g. as purchased, indicated an initial density of 1.326 g./cc. These plates were impregnated 7 times with furfuryl alcohol catalyzed with UNH in the ratio of 15 g. UNH/100 cc. furfuryl alcohol. In each case the impregnations were carried on at room temperature, the vacuum tank being first evacuated, then filled with the catalyzed binder and pressurized at 30 p.s.i.

After the first 3 impregnations, the plates were simply cured. After the 4th, they were cured, baked and graphitized, the total weight dropping from 118.45 g. prior to baking to 108.94 g. after graphitizing. After the 5th and 6th impregnations, the plates were only cured and after the 7th they were cured, baked and graphitized, the final weight dropping from 124.03 g. prior to baking to 116.76 g. after graphitizing. The 15 plates were then machined to a final weight of 103.85 g. and dimensions of 1.377 inches by 1.375 inches by 1.909 inches total height, indicating a final density of 1.753 g./cc.

A chemical analysis of these plates revealed a uranium fraction of 3.8 w/o, or 0.067 gram uranium per cubic centimeter of product, indicating the density of the graphite alone to be approximately 1.753−.067 or 1.686 g./cc., an increase of 22.1 percent over the starting density.

(2) *Unloaded specimens NBS304–66 and –67.*—Three commercial graphite tubes of ⅞-inch O.D. by ¼-inch I.D. and three commercial graphite rods of ⅞-inch diameter, all about three inches in length, had densitiess from 1.68 to 1.69 g./cc. These tubes and rods all received four impregnations with catalyzed furfuryl alcohol (8 g. maleic anhydride added to 100 g. uncatalyzed binder), with curing and baking steps after the 1st and 3rd impregnations, and a complete curing, baking and graphitizing cycle after the 2nd and 4th. The average density of these specimens increased to 1.87 g./cc., and the average maximum fiber stress increased to 6220 p.s.i.

IX. *Furfuryl Alcohol as Sole Source of Carbon*

(1) *Unloaded specimens BL–4 and BL–5.*—A large quantity of furfuryl alcohol was mixed with maleic anhydride in the ratio of 15.3 grams of the catalyst to 100 cc. of the uncatalyzed binder. The material was cured at 40° C. for 20 hours, then at 200° C. for 3 hours. It was then baked at 1200° C. in argon, mulled, graphitized at 2700° C., reground in the muller, and screened to mesh sizes of −100, 100 w/o; −140, 88 w/o; −170, 74.8 w/o; −200, 61.6 w/o; −230, 46.3 w/o; −270, 45 w/o; and −325, 34.4 w/o.

20 grams of fresh furfuryl alcohol catalyzed in the same manner were added to 100 grams of this flour. Each of two specimens was warm pressed in a 2-inch diameter die, BL–4 at 15 tons and BL–5 at 30 tons. Each was then hot pressed in the usual manner, machined and cut for transverse break tests. Each specimen had a final density of 1.28 g./cc. BL–4 had maximum fiber stresses of 2930 and 3220 p.s.i., while BL–5 had 2060 and 2300 p.s.i.

X. *Layered Graphite*

(1) *Specimen LBF–13.*—Each loaded outside layer and the inside layer was a 2-inch diameter could pressed compact of 15 grams. Each of the two loaded layers was made from a mixture of 2036 g. graphite flour, 226 g. thermal carbon, 738 g. UO₂, and 480 grams of furfuryl alcohol catalyzed with a maleic anhydride addition of 10 grams per 100 grams of uncatalyzed binder. The unloaded layer was made from a mixture of 90 g. graphite flour, 10 g. thermal carbon and 20 g. furfuryl alcohol catalyzed with a maleic anhydride addition of 10 g. per 100 g. of uncatalyzed binder.

The assembled layers were warm pressed and then hot pressed. Final density was 2.05 g./cc. and maximum fiber stresses (transverse break specimens being cut to include all 3 layers) were 3200 and 2900 p.s.i.

(2) *Specimens LBF–22 to LBF–24.*—The same three 15-gram charges as in Example X–1 above were prepared and loaded as powders into a 2-inch diameter steel die and were cold pressed, cured, baked and graphitized. The final over-all density was 2.08 g./cc. and maximum fiber stress was 2980 p.s.i.

600 gram charges of the same composition and layering were both cold pressed and warm pressed to form plates 6 inches x 8 inches by about 0.33 inch thick. These plates were impregnated three times, each impregnation being followed by a curing step, coked (baked), and graphitized. Final densities for the three cold pressed specimens ranged from 2.14 to 2.16 g./cc. and for the four warm pressed specimens 2.21 to 2.17 g./cc., while maximum fiber stresses were 4135 to 4375 p.s.i. for the cold pressed specimens and from 3600 to 4800 for the warm pressed plates.

(3) A two-layer graphite compact, one containing copper powder and one unloaded, was prepared from a basic mixture of 85 g. graphite flour, 15 g. thermal carbon and 20 g. of furfuryl alcohol catalyzed with a maleic anhydride addition of 16 g. catalyst per 100 g. uncatalyzed binder. 40 g. of this mixture constituted the charge for the unloaded layer, an equal original weight being adjusted to make the loaded layer by replacing 30 w/o of the graphite flour with freshly reduced copper powder, −325 mesh. The compact was not tested. The copper in the graphite is believed to exist largely as a separate phase.

XI *Other Binders*

(1) *Loaded specimen LCR–407.*—Cold pressing plus double impregnation. A dry blend was made of 79.16 w/o graphite flour, 13.97 w/o thermal carbon, and 6.87 w/o UO₂. To 100 grams of this mixture there was added 20 g. of an unfilled phenol formaldehyde resin catalyzed with a maleic anhydride addition of 9 grams per 100 cc. of uncatalyzed resin. A 45-gram charge of this mix was cold pressed in a 2-inch diameter die, cured, impregnated with the same binder, baked, re-cured and re-baked, impregnated a second time and again cured and baked and finally graphitized. Final density was 1.89 g./cc. and maximum fiber stress 4224 p.s.i.

(2) *Unloaded specimen J–660.*—An 85 g. graphite flour and 15 g. thermal carbon dry mix was mixed with 20 g. of phenol formaldehyde binder catalyzed with a commercial catalyst in the ratio of 10 cc. catalyst per 100 cc. uncatalyzed binder. A 40-gram charge was cold pressed in a 2-inch diameter die, cured, impregnated with furfuryl alcohol containing 8 g. maleic anhydride per 100 g. uncatalyzed resin, re-cured, baked, impregnated a second time as before, recured, re-baked and graphitized. The final density was 1.85 g./cc. and average maximum fiber stress was 3528 p.s.i.

It is apparent from the above examples that many modifications in the concept of the present invention may be made by those skilled in the art without departing from the spirit thereof. The primary source of carbon is usually a mixture of coke or graphite flour and one of the fine-grained carbon blacks or a very fine graphite flour, but innumerable variations in their ratio are possible, depending on the characteristics desired in the final graphite end product.

It is now known that graphitized bodies may include "loadings" of other materials, primarily metal carbides formed by the reduction of other compounds of such metals incorporated in the starting mix, e.g., the oxides. The present invention embraces loadings achieved in both this manner and by the incorporation of metal compounds in the binders of the present invention.

While the above examples are confined to processes which include one or more forming steps to obtain massive graphitic bodies, it is apparent that such forming step or steps can be omitted where the object is to obtain a graphite flour for further use in preparing massive graphite.

As used in the appended claims, the expressions "graphitizable mixture" and "graphitizable body" are intended to include both materials which leave essentially only a graphite residue and those which leave such residues plus metal carbides or metals.

What is claimed is:

1. The method of making graphite which comprises the steps of blending a graphitizable mixture including a primary source of carbon with a furfuryl alcohol binder, said binder containing a uranyl nitrate hexahydrate hardener, heating the blended mixture through a curing range of temperatures to polymerize said binder, heating said body through a baking range of temperatures, heating said body through a graphitizing range of temperatures, said process also including the operation of forming the graphitizable mixture to a desired shape by pressure, said pressure being initially applied prior to said polymerization of said mixture in said step of heating through a curing range of temperatures.

2. The method of claim 1 wherein the uranyl nitrate hexahydrate is added in the range of from about 2 grams to about 30 grams per one hundred cubic centimeters of furfuryl alcohol.

3. The method of claim 1 wherein a uranium oxide is added to the graphitizable mixture prior to the heating and pressure steps.

4. The method of claim 1 in which said graphitizable mixture consists of at least two discrete layers of different compositions and wherein said layers are pressed together in a single operation, said cold pressing operation terminating before said curing step.

5. The method of claim 1 in which said graphitizable mixture consists of at least two discrete layers of different compositions and wherein said layers are pressed together in a single warm pressing operation lasting throughout said curing step and terminating before said baking step.

6. The method of claim 1 wherein the formation of the blended mixture consists essentially of
   (a) mixing furfuryl alcohol with uranyl nitrate hexahydrate,
   (b) hardening by heating at a low temperature,
   (c) baking,
   (d) graphitizing,
   (e) grinding the resulting solid material, and
   (f) adding to this ground material another quantity of liquid furfuryl alcohol and uranyl nitrate hexahydrate.

7. The method of claim 1 wherein the pressure step is carried out by extrusion, methyl cellulose having been added to the mixture before the extrusion step is completed.

8. The method of claim 7 wherein the methyl cellulose is added in the proportion of about 0.25 to 7.5 weight percent of the total weight of all materials.

9. The method of making graphite which comprises the steps of blending a graphitizable mixture including a primary source of carbon with a furfuryl alcohol binder, said binder containing a uranyl nitrate hexahydrate hardener, the next step in said process comprising the hot pressing of said mixture at a temperature between about 2500 and 3000° C. and at a pressure of about 1000 p.s.i.

References Cited in the file of this patent

UNITED STATES PATENTS

| | | |
|---|---|---|
| 1,556,990 | Henry | Oct. 13, 1925 |
| 1,885,234 | Crowley | Nov. 1, 1932 |
| 2,125,588 | Ridgway | Aug. 2, 1938 |
| 2,190,672 | Meharg | Feb. 20, 1940 |
| 2,270,199 | Thrune | Jan. 13, 1942 |
| 2,277,362 | Cole | Mar. 24, 1942 |
| 2,410,760 | Heyroth | June 11, 1946 |
| 2,502,183 | Swallen | Mar. 28, 1950 |
| 2,521,495 | Wilhelm | Sept. 5, 1950 |
| 2,709,659 | Werking | May 31, 1955 |
| 2,761,848 | Bushong et al. | Sept. 4, 1956 |
| 2,772,176 | Leitten | Nov. 27, 1956 |
| 2,997,744 | Stoddard | Aug. 29, 1961 |
| 3,089,195 | Woodburn | May 14, 1963 |

FOREIGN PATENTS

| | | |
|---|---|---|
| 783,481 | Great Britain | Sept. 25, 1957 |